US012781830B2

(12) United States Patent
Porsby et al.

(10) Patent No.: US 12,781,830 B2
(45) Date of Patent: Nov. 3, 2026

(54) FLYWHEEL DEVICE FOR A SYNCRONOUS CONDENSER

(71) Applicant: ABB Schweiz AG, Baden (CH)

(72) Inventors: Gunnar Porsby, Västerås (SE); Alexandra Popovic Sandberg, Västerås (SE); Magnus Lundin, Västerås (SE); Mari Bergman, Västerås (SE); Mats Flood, Sala (SE); David Bjerhag, Västerås (SE); Jonas Lundqvist, Västerås (SE); Staffan Sköldmark, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 205 days.

(21) Appl. No.: 18/715,801

(22) PCT Filed: Dec. 5, 2022

(86) PCT No.: PCT/EP2022/084436
§ 371 (c)(1),
(2) Date: Jun. 3, 2024

(87) PCT Pub. No.: WO2023/104722
PCT Pub. Date: Jun. 15, 2023

(65) Prior Publication Data

US 2025/0035184 A1 Jan. 30, 2025

(30) Foreign Application Priority Data

Dec. 6, 2021 (EP) .................................... 21212427

(51) Int. Cl.
*F16F 15/315* (2006.01)

(52) U.S. Cl.
CPC .................................. *F16F 15/315* (2013.01)

(58) Field of Classification Search
CPC ....... A61B 2503/10; A61B 5/002; A61B 5/01; A61B 5/02438; A61B 5/1038; A61B 5/1116; A61B 5/1118; A61B 5/112; A61B 5/1123; A61B 5/1124; A61B 5/6807; A61B 5/6828; A61B 5/6829; A63B 2071/0694;
(Continued)

(56) References Cited

U.S. PATENT DOCUMENTS 7,847,423 B1 * 12/2010 Farkas .................. H02K 11/21
290/31
10,103,600 B2 * 10/2018 Dugas .................... F16F 15/31
(Continued)

FOREIGN PATENT DOCUMENTS

CN 106253564 A 12/2016
CN 110176823 A 8/2019
(Continued)

OTHER PUBLICATIONS

JP-2011182516-A, all pages (Year: 2011).*
(Continued)

*Primary Examiner* — Naishadh N Desai
(74) *Attorney, Agent, or Firm* — Greenberg Traurig, LLP

(57) ABSTRACT

A flywheel device for a synchronous condenser, including: a flywheel shaft, a flywheel unit having a moment of inertia of at least 10000 $kgm^2$, arranged around the flywheel shaft, a protective cage arranged radially outside the flywheel unit, and an outer casing accommodating the flywheel unit and the protective cage.

17 Claims, 2 Drawing Sheets

(58) Field of Classification Search
CPC ........ A63B 2071/1258; A63B 2220/12; A63B 2220/56; A63B 2220/803; A63B 2220/836; A63B 2225/20; A63B 2225/50; A63B 2230/06; A63B 2230/42; A63B 2230/50; A63B 2243/0025; A63B 24/0062; A63B 71/1225; G16H 20/30; F16F 15/315; H02K 7/02; Y02E 60/16
See application file for complete search history.

(56) References Cited

U.S. PATENT DOCUMENTS

| | | | | |
|---|---|---|---|---|
| 10,279,785 | B1 * | 5/2019 | Shapiro | B60T 1/08 |
| 2011/0277587 | A1 * | 11/2011 | Dugas | H02K 7/025<br>74/573.1 |
| 2014/0260779 | A1 * | 9/2014 | Prober | F16C 19/55<br>74/572.11 |
| 2015/0204418 | A1 * | 7/2015 | Dugas | F16F 15/31<br>29/890.12 |
| 2015/0381012 | A1 * | 12/2015 | Dugas | F16F 15/31<br>310/74 |
| 2016/0241106 | A1 * | 8/2016 | Veltri | H02K 7/025 |
| 2018/0138779 | A9 * | 5/2018 | Dugas | H02K 7/108 |
| 2022/0166289 | A1 * | 5/2022 | McIntosh | H02K 7/02 |
| 2023/0396125 | A1 * | 12/2023 | Tanimoto | F03G 3/08 |

FOREIGN PATENT DOCUMENTS

| | | | | | |
|---|---|---|---|---|---|
| DE | 19827259 | A1 | | 12/1999 | |
| EP | 3559502 | A1 | | 10/2019 | |
| JP | 60160348 | A | | 8/1985 | |
| JP | 2001268822 | A | * | 9/2001 | |
| JP | 2011182516 | A | * | 9/2011 | |
| WO | WO-9724536 | A1 | * | 7/1997 | F16C 17/10 |
| WO | 2018114485 | A1 | | 6/2018 | |
| WO | WO-2022011267 | A2 | * | 1/2022 | F03D 9/12 |

OTHER PUBLICATIONS

WO-9724536-A1, all pages (Year: 1997).*
JP-2001268822-A, all pages (Year: 2001).*
WO-2022011267-A2, all pages (Year: 2022).*
Jim Arseneaux; "20 MW Flywheel Energy Storage Plant"; 2014 DOE OE Energy Storage Program Peer Review and Update Meeting; Session 7, Sep. 18, 2014; Retrieved from the Internet; 20 Pages.
Extended European Search Report; Application No. 21212427.5; Completed: Jun. 7, 2022; Mailing Date: Jun. 15, 2022; 9 Pages.
International Search Repoet and Written Opinion of the International Seaching Authority; Application No. PCT/EP2022/084436; Completed: Feb. 23, 2023; Mailing Date: Mar. 2, 2023; 14 Pages.

* cited by examiner

FLYWHEEL DEVICE FOR A SYNCRONOUS CONDENSER

TECHNICAL FIELD

The present disclosure generally relates to frequency compensation in electric grids.

BACKGROUND

Modern electric grids rely more and more on renewable energy sources such as wind turbines, solar energy sources, and wave and tidal energy sources. This results in that the grid loses some of its traditionally inherent properties provided by the rotating mass of large generators in traditional power plants. Wind turbines, for example, are generally connected to the grid via power converters, and photovoltaic cells and many other renewable energy sources do not have any rotating mass.

Flywheels have been used together with synchronous condensers to provide active and reactive power compensation. The flywheel increases the rotating mass of the synchronous condenser and thus counteracts frequency fluctuations in the grid for example due to momentary load variations.

Flywheels used in grid compensating applications generally have a very large moment of inertia to compensate for load variations in the grid. Therefore, to protect the surroundings in case of a flywheel fault, such as a loose rotor event or a burst disc fault, the flywheel may be arranged in a reinforced concrete structure. A loose rotor event is caused by a failure in the oil lubrication system of the bearings of the flywheel and may cause the entire flywheel shaft to come loose. A burst disc fault is caused by cracks in the flywheel and may lead to the entire or a part of the flywheel coming loose.

It is cumbersome to build protective structures, and they may in worst case scenarios fail to provide adequate protection in some fault situations.

SUMMARY

A general object of the present disclosure is to provide a flywheel device that solves or at least mitigates the problems of the prior art.

There is hence according to a first aspect of the present disclosure provided a flywheel device for a synchronous condenser, comprising: a flywheel shaft, a flywheel unit having a moment of inertia of at least 10000 $kgm^2$, arranged around the flywheel shaft, a protective cage arranged radially outside the flywheel unit, and an outer casing accommodating the flywheel unit and the protective cage.

The protective cage is configured to provide protection from the flywheel unit in case of a fault. The protective case is designed to withstand flywheel unit failures such as burst disc faults and loose rotor events. The protective cage is dimensioned in terms of thickness to keep the flywheel unit within the protective cage in case of flywheel unit failures such as burst disc faults and loose rotor events.

The flywheel device may thus be made more compact than existing flywheel devices for synchronous condensers built into reinforced concrete structures. It is further simpler to install the flywheel device and it provides adequate protection against catastrophic failures such as loose rotor events and burst disc faults.

The flywheel unit may according to an example have a moment of inertia of at least 20000 $kgm^2$, such as at least 25000 $kgm^2$.

The term flywheel device as used herein excludes rotating electric machines such as generators and motors.

There is no electromagnetic interaction between the flywheel unit and the protective cage when the flywheel unit rotates.

The flywheel unit and the protective cage are free of electrically conducting windings.

According to one embodiment the protective cage comprises an annular core circumferentially entirely enclosing the flywheel unit. The annular core thus extends around the entire circumference of the flywheel unit.

The axial length of the annular core may be at least as great as the axial length of the flywheel unit.

The annular core is arranged radially spaced apart from the circumferential surface of the flywheel unit.

The annular core may be solid. The annular core may alternatively comprise a plurality of radial cooling ducts.

The annular core has a circular through-opening in which the flywheel unit is arranged.

According to one embodiment the annular core has a radial thickness dimension of at least 0.1 m, such as at least 0.2 m.

According to one embodiment the annular core has radial thickness dimension of at most 0.6 m.

According to one embodiment the annular core comprises a plurality of sheets or plates arranged one after the other in a longitudinal direction of the flywheel shaft.

According to one embodiment each sheet or plate circumferentially entirely encloses the flywheel unit.

According to one embodiment the protective cage comprises a first and a second axial end wall attached to a respective axial end of the annular core, each of the first and the second axial end wall being provided with an end opening that has a smaller area than a circular through-opening of the annular core. Each end opening is thus smaller than the circular through-opening of the annular core. The first and the second axial end walls thus provide lateral protection against the flywheel unit which is enclosed in the protective cage.

According to one embodiment the first axial end wall is mounted to a first axially outermost sheet or plate at a first axial end of the annular core and the second axial end wall is mounted to a second axially outermost sheet or plate at a second axial end of the annular core.

One embodiment comprises crossbeams extending between the first axial end wall and the second axial end wall. Further reinforcement of the protective cage is thereby provided.

According to one embodiment the protective cage comprises a first and a second ground attachment structure for attaching the protective cage to the ground. The flywheel device can thus be fixated to ground to ensure that it cannot overturn.

The first ground attachment structure and the second ground attachment structure may for example comprise through-openings configured to receive bolts and/or screws for attaching the annular core to the ground.

According to one embodiment the first ground attachment structure and the second ground attachment structure support the annular core. The first ground attachment structure and the second ground attachment structure are arranged underneath the annular core.

The first ground attachment structure and the second ground attachment structure may be arranged integral with the annular core.

The first ground attachment structure and the second ground attachment structure may be welded to the annular core and/or they may be attached to the annular core by means of screws or bolts, and/or by press fitting.

According to one example a subset of the sheets or plates may extend radially further away from other sheets or plates in a radial outward direction. Each one of these sheets or plates may extend to and may be in direct contact with at least one of the first and second ground attachment structures. The lower ends of these sheets or plates may form support structures or legs of the annular core, each standing on at least one of the first and the second ground attachment structure.

According to one embodiment the protective cage is made of metal such as steel.

The steel may for example be high-strength steel, ultra-high-strength steel, or high-strength low-alloy steel.

According to one embodiment the outer casing is made of metal such as steel.

According to one embodiment the synchronous condenser is configured to be connected to an electric grid operating in a voltage range of 5-15 kV.

The electric grid may be a distribution grid.

There is according to a second aspect of the present disclosure provided a synchronous condenser assembly configured to be connected to an electric grid, comprising: a flywheel device according to the first aspect, and a synchronous condenser comprising a synchronous condenser shaft connected to the flywheel shaft.

One embodiment comprises a pony motor configured to drive the synchronous condenser shaft up to a synchronisation speed of the electric grid.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
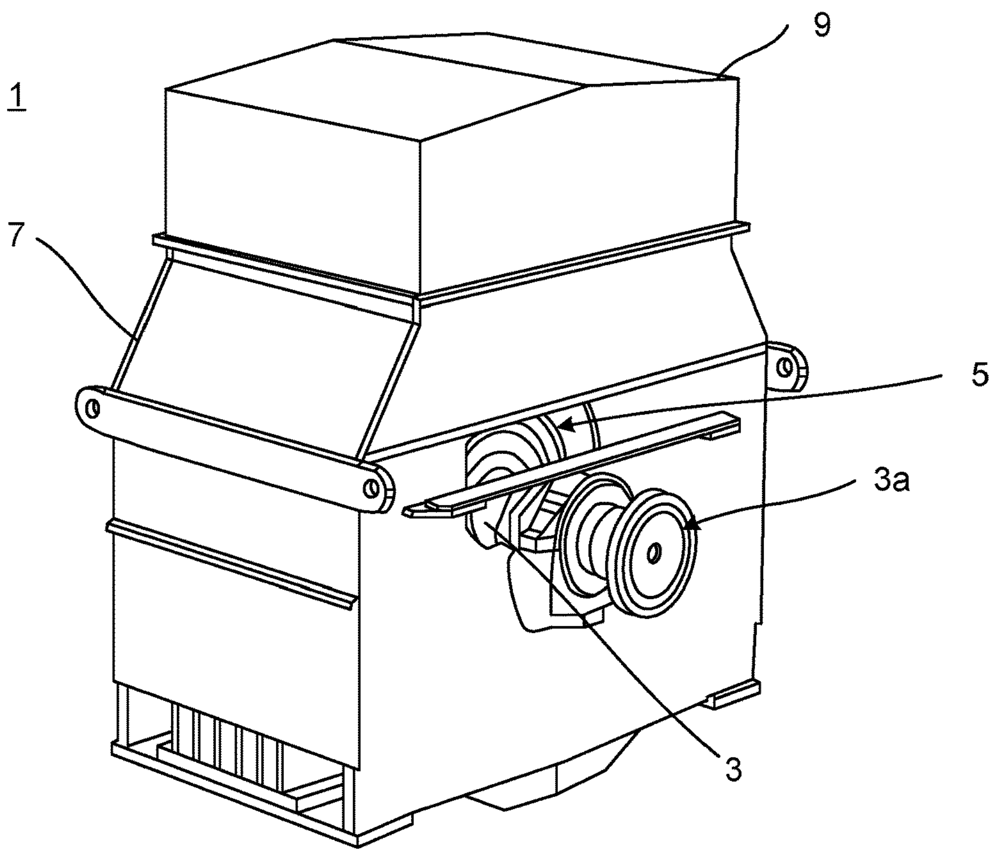
FIG. 1 is a perspective view of an example of a flywheel device.

FIG. 1 shows an example of a flywheel device 1. The flywheel device 1 is configured for use with a synchronous condenser.

The synchronous condenser may for example be configured to be connected to a distribution grid. The synchronous condenser may for example be configured to be connected to an electric grid operating in a voltage range of 5-15 kV.

The flywheel device 1 comprises a flywheel shaft 3 and a flywheel unit 5 arranged around the flywheel shaft 3.

The flywheel shaft 3 is configured to be connected to a synchronous condenser shaft.

A first end 3*a* of the flywheel shaft 3 is configured to be connected to the synchronous condenser shaft. The first end 3*a* may for example comprise an axial opening having a non-circular cross-sectional shape configured to engage with a corresponding axially extending structure of the synchronous condenser shaft to prevent relative rotation between the flywheel shaft 3 and the synchronous condenser shaft.

Alternatively, the first end 3*a* may be provided with the axially extending structure and the synchronous condenser shaft may be provided with the axial opening having a non-circular cross-sectional shape.

The flywheel shaft 3 may be configured to be connected to a pony motor shaft of a pony motor. A second end of the flywheel shaft 3 may be configured to be connected to the pony motor shaft.

The flywheel unit 5 may comprise a single flywheel. Alternatively, the flywheel unit 5 may comprise a plurality of flywheels arranged one after the other along the flywheel shaft 3.

The flywheel unit 5 has a moment of inertia of at least 10000 $kgm^2$.

The flywheel device 1 comprises a protective cage 11 (see FIG. 2) which completely encircles the flywheel unit 5. The protective cage 11 thus surrounds the flywheel unit 5 circumferentially.

The protective cage 11 may for example be made of metal. The metal may be steel such as high-strength steel, ultra-high-strength steel, or high-strength low-alloy steel.

The flywheel device 1 comprises an outer casing 7 that houses the flywheel unit 5 and the protective cage 11. The outer casing 7 may be made of metal. The metal may for example be steel such as stainless steel.

The main functionality of the outer casing 7 is to enclose the flywheel unit 5 to protect operators from accidentally contacting the flywheel unit 5 when it rotates.

The flywheel device 1 may also comprise a cooling unit 9. The cooling unit 9 may have a housing that forms part of the outer casing 7. The cooling unit 9 is configured to provide cooling of the flywheel unit 5. The cooling unit 9 may for example be a water-cooling or an air-cooling unit.

Figure 2:
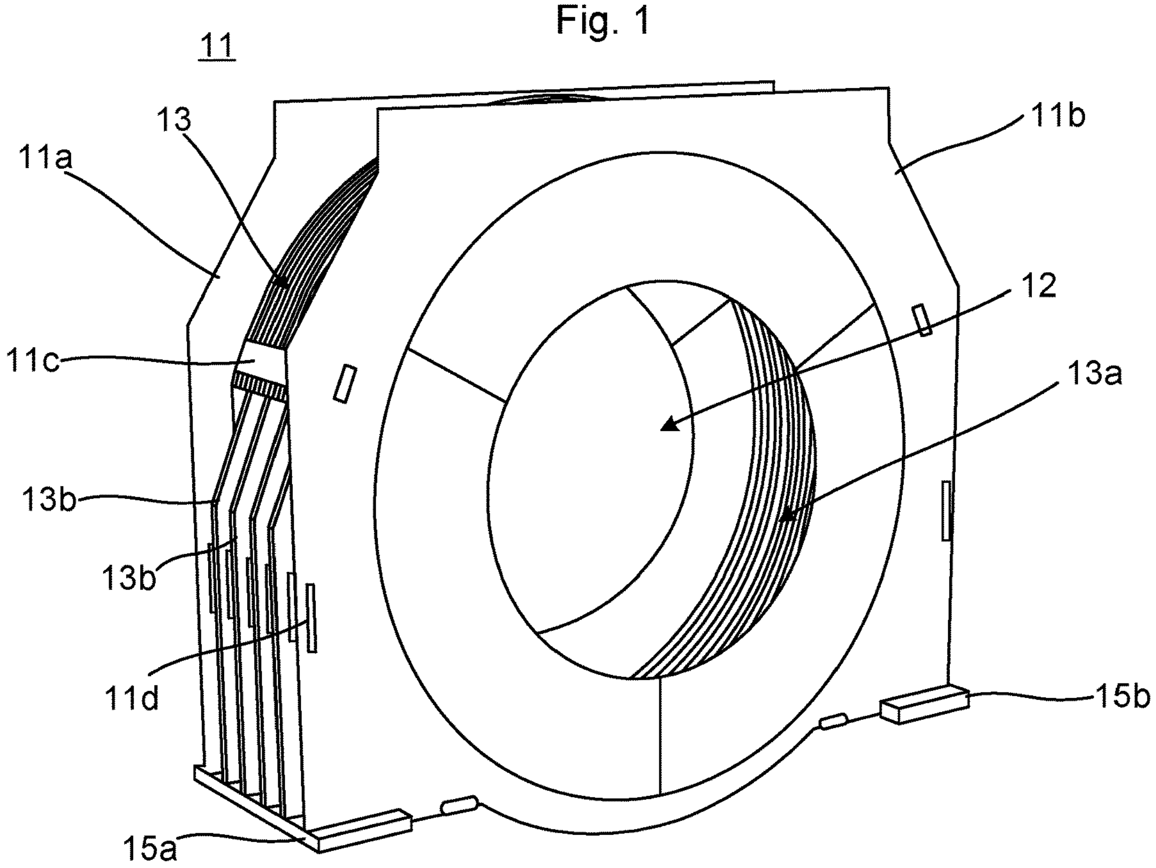
FIG. 2 is a perspective view of an example of a protective cage.

Turning now to FIG. 2, an example of the protective cage 11 is shown. The protective cage 11 comprises an annular core 13. The exemplified annular core 13 has a circular through-opening 12 in which the flywheel unit 5 is arranged to rotate about its rotational axis.

The exemplified annular core 13 comprises a plurality of sheets or plates 13*a*, 13*b* arranged one after the other in the axial direction of the flywheel shaft 3. Each sheet or plate 13*a*, 13*b* is annular, enclosing the flywheel unit 5 circumferentially. Adjacent sheets or plates 13*a*, 13*b* may be in direct physical contact with each other, or they may be bonded to each other, for example by means of an adhesive such as glue, to form a laminated annular core 13.

The sheets or plates 13*a*, 13*b* may be made of metal. The metal may be steel such as high-strength steel, ultra-high-strength steel, or high-strength low-alloy steel.

According to one example, two or more semi-circular sheets or plates may form a single annular sheet or plate 13*a*, 13*b*. The semi-circular sheets or plates may be arranged interleaved in the axial direction. The contact points between semi-circular sheets or plates of adjacent sheets or plates 13*a*, 13*b* may thus be offset from each other in the circumferential direction. Alternatively, each annular sheet or plate 13*a*, 13*b* may be a single integral structure.

According to one example, a subset of sheets or plates 13*b* of the sheets or plates 13*a*, 13*b* may extend radially further away from other sheets or plates 13*a* in a radial outward direction. The sheets or plates 13*b* of the subset thus extend laterally forming a fin-like structure extending from the remaining sheets or plates 13*b* in a direction away from the circular through-opening 12 of the annular core 13 which circumferentially encloses the flywheel unit 5.

The protective cage 11 comprises a first ground structure 15*a* and a second ground structure 15*b*. The first ground attachment structure 15*a* and the second ground attachment structure 15*b* support the annular core 13. The annular core 13 stands on the first ground attachment structure 15*a* and the second ground attachment structure 15*b*.

The first ground structure 15*a* and a second ground structure 15*b* may be planar structures configured for attachment of the protective cage 11 to ground, for example by means of screws and/or bolts. The first ground structure 15*a* and the second ground structure 15*b* may comprise through-openings configured to receive bolts and/or screws.

According to the example, each sheet or plate 13*b* of the subset extends to and is in contact with at least one of the first and second ground attachment structures 15*a*, 15*b*.

The annular core 13 may have a radial thickness dimension of at least 0.1 m, such as at least 0.2 m, such as at least 0.3 m, such as at least 0.4 m.

The annular core 13 may according to one example have a radial thickness dimension of at most 0.6 m, such as at most 0.5 m.

The radial thickness dimension is the radial distance between a point at the inner surface and a point at the outer surface of the annular core, i.e., along a radial line.

The protective cage 11 comprises a first axial end wall 11*a* and a second axial end wall 11*b*. The first axial end wall 11*a* is attached to one axial end of the annular core 13. The second axial end wall 11*b* is attached to the other axial end of the annular core 13.

The first axial end wall 11*a* may be mounted to a first axially outermost sheet or plate 13*a*, 13*b* and the second axial end wall 11*b* may be mounted to a second axially outermost sheet or plate 13*a*, 13*b*.

Each of the first axial end wall 11*a* and the second axial end wall 11*b* is provided with an end opening that is smaller in area than the circular through-opening 12 of the annular core 13. Minimum radial dimensions of the end openings are smaller than the diameter of the flywheel unit 5. The first axial end wall 11*a* and the second axial end wall 11*b* thus provide lateral protection of the flywheel unit 5 arranged inside the annular core 13.

The protective cage 11 may comprise crossbeams 11*c*, 11*d* extending between the first axial end wall 11*a* and the second axial end wall 11*b*. Some of the crossbeams 11*d* may extend only through the sheets or plates 13*b* of the subset. The crossbeams 11*c*, 11*d* may be arranged to provide a mechanical connection between the first axial end wall 11*a* and the second axial end wall 11*b*.

Figure 3:
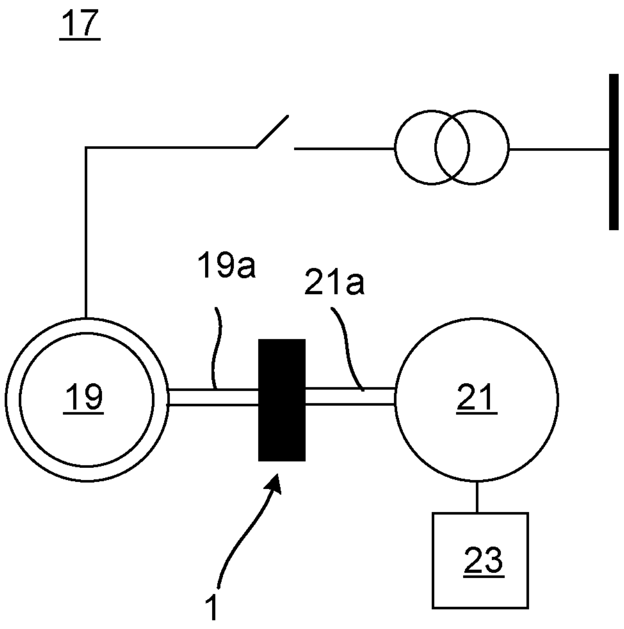
FIG. 3 diagrammatically shows a synchronous condenser assembly.

FIG. 3 shows a circuit diagram of a synchronous condenser assembly 17 connected to an electric grid.

The synchronous condenser assembly 17 comprises the flywheel device 1 and a synchronous condenser 19.

The exemplified synchronous condenser assembly 17 comprises a pony motor 21. The synchronous condenser assembly 17 may also comprise a drive, such as a variable speed drive, 23 configured to drive the pony motor 21.

The synchronous condenser 19 comprises a synchronous condenser shaft 19*a* configured to be connected to the flywheel shaft 3.

The pony motor 21 comprises a pony motor shaft 21*a* configured to be connected to the flywheel shaft 3.

The pony motor 21 is configured to drive the synchronous condenser shaft 19*a* via the flywheel shaft 3 up to a synchronisation speed of the electric grid.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A flywheel device for a synchronous condenser, comprising:

a flywheel shaft, a flywheel unit having a moment of inertia of at least 10000 kgm$^2$, arranged around the flywheel shaft, a protective cage arranged radially outside the flywheel unit, and an outer casing accommodating the flywheel unit and the protective cage, wherein the protective cage comprises an annular core circumferentially entirely enclosing the flywheel unit, and wherein the annular core comprises a plurality of sheets or plates arranged one after the other in a longitudinal direction of the flywheel shaft.

2. The flywheel device as claimed in claim 1, wherein the annular core has a radial thickness dimension of at least 0.1 m.

3. The flywheel device as claimed in claim 1, wherein the annular core has a radial thickness dimension of at most 0.6 m.

4. The flywheel device as claimed in claim 1, wherein each sheet or plate circumferentially entirely encloses the flywheel unit.

5. The flywheel device as claimed in claim 1, wherein the protective cage comprises a first and a second axial end wall attached to a respective axial end of the annular core, each of the first and the second axial end wall being provided with an end opening that has a smaller area than a circular through-opening of the annular core.

6. The flywheel device as claimed in claim 5, wherein the first axial end wall is mounted to a first axially outermost sheet or plate at a first axial end of the annular core and the second axial end wall is mounted to a second axially outermost sheet or plate at a second axial end of the annular core.

7. The flywheel device as claimed in claim 5, comprising crossbeams extending between the first axial end wall and the second axial end wall.

8. The flywheel device as claimed in claim 1, wherein the protective cage is made of metal.

9. The flywheel device as claimed in claim 1, wherein the protective cage comprises a first and a second ground attachment structure for attaching the protective cage to the ground.

10. The flywheel device as claimed in claim 9, wherein the first ground attachment structure and the second ground attachment structure support the annular core.

11. The flywheel device as claimed in claim 1, wherein the outer casing is made of metal.

12. The flywheel device as claimed in claim 1, wherein the synchronous condenser is configured to be connected to an electric grid operating in a voltage range of 5-15 kV.

13. A synchronous condenser assembly configured to be connected to an electric grid, comprising:

a flywheel device for a synchronous condenser, having:

a flywheel shaft, a flywheel unit having a moment of inertia of at least 10000 $kgm^2$, arranged around the flywheel shaft, a protective cage arranged radially outside the flywheel unit, and an outer casing accommodating the flywheel unit and the protective cage, and a synchronous condenser having a synchronous condenser shaft connected to the flywheel shaft, wherein the protective cage comprises an annular core circumferentially entirely enclosing the flywheel unit, and wherein the annular core comprises a plurality of sheets or plates arranged one after the other in a longitudinal direction of the flywheel shaft.

14. The synchronous condenser assembly as claimed in claim 13, comprising a pony motor configured to drive the synchronous condenser shaft up to a synchronisation speed of the electric grid.

15. The flywheel device as claimed in claim 2, wherein the annular core has a radial thickness dimension of at most 0.6 m.

16. The flywheel device as claimed in claim 2, wherein the annular core comprises a plurality of sheets or plates arranged one after the other in a longitudinal direction of the flywheel shaft.

17. The flywheel device as claimed in claim 2, wherein the protective cage comprises a first and a second axial end wall attached to a respective axial end of the annular core, each of the first and the second axial end wall being provided with an end opening that has a smaller area than a circular through-opening of the annular core.

* * * * *